(12) United States Patent
Tielemans et al.

(10) Patent No.: US 12,513,204 B2
(45) Date of Patent: *Dec. 30, 2025

(54) VIDEO STREAMING

(71) Applicant: Dolby International AB, Dublin (IE)

(72) Inventors: Maarten Tielemans, Langdorp (BE); Pieter-Jan Speelmans, Diest (BE); Steven Tielemans, Leuven (BE); Egon Okerman, Sint-Genesius-Rode (BE)

( * ) Notice: Subject to any disclaimer, the term of this patent is extended or adjusted under 35 U.S.C. 154(b) by 0 days.

This patent is subject to a terminal disclaimer.

(21) Appl. No.: 18/318,142

(22) Filed: May 16, 2023

(65) Prior Publication Data

US 2023/0291777 A1 Sep. 14, 2023

Related U.S. Application Data

(63) Continuation of application No. 16/964,299, filed as application No. PCT/EP2019/051155 on Jan. 17, 2019, now Pat. No. 11,695,816.

(30) Foreign Application Priority Data

Jan. 23, 2018 (EP) .................................... 18152938

(51) Int. Cl.
*H04L 65/61* (2022.01)
(52) U.S. Cl.
CPC .................................... *H04L 65/61* (2022.05)
(58) Field of Classification Search
CPC .. H04L 65/4069; H04N 19/33; H04N 19/132; H04N 19/136; H04N 19/146; H04N 19/172; H04N 19/177; H04N 21/4384; H04N 21/2187; H04N 21/2343; H04N 21/8456; H04N 21/23424

USPC ......................................................... 709/203
See application file for complete search history.

(56) References Cited

U.S. PATENT DOCUMENTS

| | | | |
|---|---|---|---|
| 11,695,816 B2 | 7/2023 | Tielemans et al. | |
| 2012/0047542 A1 | 2/2012 | Lewis et al. | |
| 2012/0117263 A1 | 5/2012 | Xu et al. | |
| 2014/0150019 A1 | 5/2014 | Ma et al. | |

(Continued)

FOREIGN PATENT DOCUMENTS

| | | |
|---|---|---|
| EP | 3515075 A1 | 7/2019 |
| KR | 10-2014-0004262 A | 1/2014 |

(Continued)

OTHER PUBLICATIONS

International Search Report and Written Opinion from PCT Application No. PCT/EP2019/051155, Feb. 15, 2019.

(Continued)

*Primary Examiner* — Glenford J Madamba

(57) ABSTRACT

A server for streaming a video to a client involves making the video available from the server to the client upon request in at least a temporal independent version and a temporal dependent version. The server is configured for: i) receiving a request from the client to receive a stream of the video from an arbitrary starting point in time; and ii) retrieving at least the first frame from the temporal independent version; and iii) retrieving frames subsequent to the at least first frame from the temporal dependent version; and iv) sending the at least first frame to the client and send the frames subsequent to the at least first frame to the client.

19 Claims, 5 Drawing Sheets

(56) References Cited

U.S. PATENT DOCUMENTS

| | | | |
|---|---|---|---|
| 2014/0282766 A1* | 9/2014 | Good | H04N 21/2225 725/93 |
| 2014/0365675 A1 | 12/2014 | Bhardwaj et al. | |
| 2015/0019629 A1 | 1/2015 | Giladi et al. | |
| 2015/0026289 A1 | 1/2015 | Nordness et al. | |
| 2015/0067722 A1 | 3/2015 | Bjordammen et al. | |
| 2016/0029076 A1 | 1/2016 | Huber et al. | |
| 2016/0234504 A1* | 8/2016 | Good | H04N 19/146 |
| 2016/0277466 A1 | 9/2016 | Lohmar et al. | |
| 2017/0272485 A1 | 9/2017 | Gordon et al. | |
| 2017/0310752 A1 | 10/2017 | Knothe | |
| 2019/0222879 A1 | 7/2019 | Jones et al. | |
| 2020/0037008 A1 | 1/2020 | Hassler | |
| 2023/0164398 A1 | 5/2023 | Okerman et al. | |

FOREIGN PATENT DOCUMENTS

| | | |
|---|---|---|
| WO | WO 2016/093752 A1 | 6/2016 |
| WO | WO 2018/231527 A1 | 12/2018 |
| WO | WO 2019/145217 A1 | 8/2019 |

OTHER PUBLICATIONS

Search Report from corresponding EP Application No. EP18152938, Jun. 15, 2018.

[No Author Listed], "Comparing Adaptive HTTP Streaming Technologies: A Comparison of Apple's HTTP Live Streaming (HLS), Microsoft's Silverlight Smooth Streaming (MSS) and Adobe's HTTP Dynamic Streaming (HDS)," RGB Networks, Nov. 1, 2011, 20 pages.

[No Author Listed], "Information technology—Dynamic adaptive streaming over http (DASH)—Part 1: Media presentation description and segment formats," ISO/IEC 1/SC 29, 23009-1:2013(E), Aug. 2, 2013, server date Nov. 4, 2013, 150 pages.

Extended European Search Report in European Appln. No. 20170744.5, Jul. 30, 2020, 8 pages.

Fielding et al., "Hypertext Transfer Protocol (HTTP/1.1): Range Requests," Internet Engineering Task Force (IETF), Request for Comments: 7233, Jun. 2014, 25 pages.

International Preliminary Report on Patentability in International Appln. No. PCT/EP2019/051155, mailed on Aug. 6, 2020, 7 pages.

International Preliminary Report on Patentability in International Appln. No. PCT/EP2021/059467, mailed on Oct. 25, 2022, 7 pages.

International Search Report and Written Opinion in International Appln. No. PCT/EP2021/059467, mailed on May 4, 2021, 11 pages.

Van Der Hooft et al., "Performance Characterization of Low-Latency Adaptive Streaming From Video Portals," IEEE Access, Aug. 3, 2018, 6:43039-43055.

U.S. Appl. No. 17/919,950, filed Oct. 19, 2022, Okerman et al.

* cited by examiner

VIDEO STREAMING

TECHNICAL FIELD

The present invention generally relates to the streaming of video from a server to a client over a communication network. More particular, the invention relates to a streaming server, a streaming client and computer-implemented methods performed on the respective server and client.

BACKGROUND

Video streaming is immensely popular nowadays. It allows viewers to start watching video content without the need to completely download the content beforehand. A large portion of the Internet traffic consists of such video streamed from servers to clients, typically from a content distribution network, a CDN, to a video player application running on a PC, a tablet, a smartphone, a set-up box, a TV etc. In video streaming, the video is further delivered on demand or on request of the client. The request then specifies a certain starting point in time upon which the video should start. This starting point may be explicit, e.g. by specifying it in the request, or implicit, e.g. where the starting point is derived from the time of the request which is the case for live streaming.

Video streams should exhibit low latency to the viewer, i.e. there should be minimal time between the viewer's request for the stream and the actual playback. Nowadays, viewers desire instant response between the moment they activate the playback and the moment the first frame of the video appears on the screen. The same is applicable for skipping through the video, the viewer desires instant playback when selecting a different playback time within the video, i.e. when skipping through the video. Another requirement is that the data footprint of the video should be small such that storage on the origin server and intermediate caching servers is small. Small storage sizes also result in lower latencies as the transfer times to the client over the bandwidth limited communication medium will be shorter. Moreover, a smaller data footprint also results in a lower cost for the communication network itself.

Different protocols and technologies for streaming video have been proposed. A first technology is progressive download which relates to the playback of media files on a client before the download of the media file is completed. A media player on the client that is capable of progressive download relies on meta data located in the header at the beginning of the media file. When the meta data and the first frames of the media have been downloaded and buffered, the media player will start the actual playback thereby considerably reducing latency. A problem with progressive download is that inherently it does not support live streaming and it doesn't support the switching between qualities and bit rates.

Apart from progressive download, there are dedicated streaming protocols that provide live streaming and switching between qualities. In general, streaming protocols divide media in smaller chunks or segments. A segment or chunk may then be played independently from another segment by providing an independent frame, also referred to as key frame, at the beginning of the segment. Such a key frame can be decoded by the client without any information on the preceding or subsequent frames. Streaming protocols may be implemented on top of specifically designed transport protocols such as The Real-time Streaming Protocol (RTSP), Real-time Transport Protocol (RTP), Real-Time Messaging Protocol (RTMP) and the Real-time Transport Control Protocol (RTCP). However, as these transport protocols have difficulties to traverse firewalls and proxies, new streaming protocols that use the standard HTTP web protocol have emerged. These protocols also offer adaptive bitrate streaming allowing the client to switch between different bit rates, resolutions or codec depending on the available resources. To achieve this, versions of the streams, each with a different bit rate, resolution of codec, are made available on the server for the client. Examples of adaptive bitrate streaming protocols are MPEG-DASH published as ISO/IEC 23009-1:2012, HTTP Dynamic Streaming by Adobe, HTTP Live Streaming (HLS) by Apple and Smooth Streaming, a Microsoft IIS Media Services extension.

The above mentioned streaming protocols still suffer from shortcomings, especially in terms of delay upon starting a video at an arbitrary point in time. When a viewer selects an arbitrary starting point to start the video stream from, the client will retrieve the video segment from the server that comprises this starting point. However, the client cannot directly start the playback at this starting point but first needs to download and decode the complete segment starting from the first key frame in order to compose the frame at the chosen starting point. In adaptive bitrate streaming protocols, the segments are typically in the order of seconds meaning that a seeking action may take considerable download and processing time to arrive at the requested frame. Furthermore, segments with a different resolution, bit rate or codec are not always aligned perfectly in time such that visible glitches may appear when the video player switches between bit rate, resolution of codec.

SUMMARY

It is an object of the present invention to overcome the above-mentioned problems and to provide a solution for streaming videos that has a low seeking delay, low latency, low start-up time, while providing strong encoding and lower bandwidth requirements.

This object is achieved, according to a first aspect of the invention by a server for streaming a video to a client over a communication network; and wherein the server is configured to make the video available to the client upon request in at least a temporal independent version and a temporal dependent version; and wherein the server is further configured to perform the following steps:
  receiving a request from the client to receive a stream of the video from an arbitrary starting point in time onwards; and
  retrieving at least the first frame of the stream from the temporal independent version of the video; and wherein the first frame corresponds with the starting point in time; and
  retrieving frames subsequent to the at least first frame from the temporal dependent version; and
  sending the at least first frame to the client and, sending the frames subsequent to the at least first frame to the client such that the video is streamed to the client and starts with at least one temporal independent frame associated with the starting point in time.

In other words, the server makes at least two versions of the same video available to clients. The temporal independent version only comprises key frames. A key frame is a frame that is decodable independently from other frames in the video. A key frame does not comprise temporal dependencies but may comprise spatial dependencies. A key frame is sometimes referred to as an I-frame. The dependent version of the video also comprises dependent frames, i.e.

frames for which information of other frames is needed in order to decode them. Frames of the dependent version may thus have temporal dependencies in order to decode them. Dependent frames are sometimes further categorized in P frames and B frames. P frames can use data from previous frames to decode and are thus more compressible than I frames. B frames can use both previous and forward frames to decode and may therefore achieve the highest amount of data compression. The server makes these two versions available to clients, i.e. clients may retrieve any chosen frame from the two versions when they request so. When a client requests a stream of the video at an arbitrary point in time, the server provides at least the first frame in an independent version and, the following frames from the dependent version of the video. The first frame does not necessarily have to be sent to the client first, but may also be sent in parallel with the dependent frames or even after the sending frames from the dependent version has been started.

It is thus an advantage that the client always receives an independent frame corresponding with the requested starting point. In other words, upon receiving the independent frame, the client can decode the frame directly and render it on the screen to the viewer. At the client side, there is thus no need to first decode other frames in order to arrive at the frame corresponding to the starting point. The delay for the viewer will thus be noticeably lower than with the solutions of the prior art. Moreover, no unnecessary frames prior to the starting need to be downloaded as is the case with segmented streaming. Furthermore, there is no segmentation of the video at the side of the server. Therefore, unnecessary further independent and dependent frames at the beginning of the segments are not transmitted to the client.

Advantageously, the retrieving the first frame further comprises selecting the first frame as:
the frame of the temporal independent version closest to the arbitrary starting point in time;
the frame of the temporal independent version subsequent to the arbitrary starting point in time; or
the frame of the temporal independent version prior to the arbitrary starting point in time.

A frame corresponds with a representation of a scene at an exact moment in time. Therefore, the chosen starting point will typically fall in between two frames of which the independent version may be selected according to the above criteria.

According to an embodiment, the temporal independent version has a lower frame rate than the temporal dependent version. This allows saving storage space because independent frames are typically considerably larger than dependent frames. The frame rate of the independent version may for example be half the rate of the dependent version.

According to an embodiment, the receiving a request further comprises:
receiving a first request for the at least the first frame of the stream; and
receiving a second request for the frames subsequent to the at least first frame.

The client thus separates the requests for frames of the independent and dependent versions. This is particular advantageous for caching, i.e. when the server itself is a caching server or when there is a caching server between the server and the client. The request for the combination of an independent frame together with the dependent frames is very unlikely to occur, but a request for the dependent frames alone is much more likely to occur, especially when the caching server can identify ranges of frames.

More advantageously, the second request is a byte range request comprising a byte range indicative for a portion of the video starting with the frames subsequent to the at least first frame. Caching servers are typically designed to recognize byte range request and to serve cached frames which are within the byte range request even when they are cached from a request for another byte range that also comprises those frames. As a result, as soon as the complete dependent version of the video has passed a caching server, the caching server will be able to serve any byte range requested by a client without having to download these frames again from the origin server.

The server according to any one of the preceding claims wherein the sending the frames comprises sending the frames as chunks of a chunked transfer encoding session with the client. This has the advantage that only one single transport session needs to be setup between the client and the server thereby further improving the efficiency of the transfer and overall latency.

Preferably, the request comprises one or more HTTP GET requests.

According to an embodiment, the server is further configured to perform the following steps:
during the sending the frames subsequent to the at least first frame, receiving from the client a further request for a temporal independent version of one of the frames subsequent to the at least first frame;
thereupon, retrieving the requested temporal independent version of one of the frames from the temporal independent version of the video; and
sending the retrieved temporal independent version of one of the frames to the client.

In other words, during the playback, the client may request other independent versions of frames, for example to improve the quality of the playback.

According to an embodiment, the server is further configured to generate a frame of the temporal independent version of the video from a source video upon receiving a request for the frame from the client. Frames of the independent version will be requested much less than the dependent version. In order to save storage space, the independent frames may be generated upon request.

According to an embodiment, the server is a caching server for cached serving of requests from the client to an origin server. In other words, when a version of one or more requested frames is not available on the server itself, the caching server will forward the request to an upstream server or directly to the origin server.

According to an embodiment, the server is an origin server. In other words, the origin server will serve all requests coming from either the client or caching server in between the client and the origin server.

The server according to any one of the preceding claims further configured to make the video available to the client upon request in at least a temporal independent version in different qualities; and wherein the server is further configured to:
during the sending the frames subsequent to the at least first frame, receiving from the client a further request for a temporal dependent or independent version of one or more frames with a different quality; and
providing the one or more frames with the different quality.

This results in an implementation of bit rate adaptation wherein the client may choose from different qualities or bit rates of the video stream. As the server does not rely on segments, the change in quality may be done within the time of one frame thereby providing a much quicker response to changes in network resources.

According to a second aspect, the invention relates to a client for streaming a video from a server over a communication network; and wherein the video is available from the server to the client upon request in at least a temporal independent and a temporal dependent version; and wherein the client is further configured to perform the following steps for any arbitrary starting point in time within the video:
  sending a request to the server to receive a stream of the video from the arbitrary starting point in time onwards; and
  receiving from the server at least the first frame of the stream from the temporal independent version of the video; and wherein the first frame corresponds with the starting point in time; and
  receiving from the server frames subsequent to the at least first frame from the temporal dependent version; and
  playing the video from the starting point in time onwards by the at least first frame followed by the frames.

The first frame may further correspond to any one of:
  the frame of the temporal independent version closest to the arbitrary starting point in time;
  the frame of the temporal independent version subsequent to the arbitrary starting point in time; and
  the frame of the temporal independent version prior to the arbitrary starting point in time.

The temporal independent version may further have a lower frame rate than the temporal dependent version.

According to an embodiment, the sending a request further comprises:
  sending a first request for the at least the first frame of the stream; and
  sending a second request for the frames subsequent to the at least first frame.

According to an embodiment, the second request further comprises a byte range request comprising a byte range indicative for a portion of the video starting with the frames subsequent to the at least first frame.

According to an embodiment, the receiving the frames comprises receiving the frames as chunks of a chunked transfer encoding session with the client.

According to an embodiment, the client is further configured to perform the following steps:
  during the receiving the frames subsequent to the at least first frame, sending a further request for a temporal independent version of one of the frames subsequent to the at least first frame;
  thereupon, receiving the temporal independent version of one of the frames to the client.

According to an embodiment, the client is further configured to perform the following steps:
  during the receiving the frames subsequent to the at least first frame, sending a further request for a temporal dependent or independent version of one or more frames with a different quality; and
  thereupon, receiving the one or more frames with the different quality from the server.

According to a third aspect, the invention relates to a communication system comprising the server according to the first aspect and a client according to the second aspect.

According to a fourth aspect, the invention relates to a communication system comprising a first server as the origin server according to the first aspect, a second server as the caching server according to the first aspect and, preferably one of more clients according to the second aspect.

According to a fifth aspect, the invention relates to a computer-implemented method for streaming a video to a client over a communication network; and wherein the video is available to the client upon request in at least a temporal independent version and a temporal dependent version; and wherein the method comprises the following steps:
  receiving a request from the client to receive a stream of the video from an arbitrary starting point in time onwards; and
  retrieving at least the first frame of the stream from the temporal independent version of the video; and wherein the first frame corresponds with the starting point in time; and
  retrieving frames subsequent to the at least first frame from the temporal dependent version; and
  sending the at least first frame to the client and sending the frames subsequent to the at least first frame to the client such that the video is streamed to the client and starts with at least one temporal independent frame associated with the starting point in time.

According to a sixth aspect, the invention relates to a computer-implemented method for streaming a video from a server over a communication network; and wherein the video is available from the server upon request in at least a temporal independent version and a temporal dependent version; and wherein the method comprises the following steps:
  sending a request to the server to receive a stream of the video from an arbitrary starting point in time onwards; and
  receiving from the server at least the first frame of the stream from the temporal independent version of the video; and wherein the first frame corresponds with the starting point in time; and
  receiving from the server frames subsequent to the at least first frame from the temporal dependent version; and
  playing the video from the starting point in time onwards by the at least first frame followed by the frames.

According to a seventh aspect, the invention relates to a computer program product comprising computer-executable instructions for performing the method according to the fifth and sixth aspect when the program is run on a computer.

According to an eighth aspect, the invention relates to a computer readable storage medium comprising the computer program product according to the seventh aspect.

DETAILED DESCRIPTION OF EMBODIMENT(S)

The present invention relates to the streaming of video from a server to a client. A video received by a client is a combination of ordered still pictures or frames that are decoded or decompressed and played one after the other within a video application. To this respect, a client may be any device capable of receiving a digital representation of a video over a communication network and capable of decoding the representation into a sequence of frames that can be displayed on a screen to a user. Examples of devices that are suitable as a client are desktop and laptop computers, smartphones, tablets, setup boxes and TVs. A client may also refer to a video player application running on any of such devices. Streaming of video refers to the concept that the client can request a video from a server and start the playback of the video upon receiving the first frames without having received all the frames of the video. A streaming server is then a server that can provide such streaming of videos upon request of a client to the client over a communication network, for example over the Internet, over a Wide Area Network (WAN) or a Local Area Network (LAN).

Video received from a streaming server is compressed according to a video compression specification or standard such as H.265/MPEG-H HEVC, H.264/MPEG-4 AVC, H.263/MPEG-4 Part 2, H.262/MPEG-2, SMPTE 421M (VC-1), AOMedia Video 1 (AV1) and VP9. According to those standards, the video frames are compressed in size by using spatial image compression and temporal motion compensation. Frames on which only spatial image compression is applied or no compression is applied are referred to as temporal independent frames, key frames, independent frames or I-frames. A key frame is thus a frame that is decodable independently from other frames in the video. Frames to which temporal motion compensation is applied, either in combination with image compression, are referred to as temporal dependent frames or, shortly dependent frames. Dependent frames are thus frames for which information of other frames is needed to decompress them. Dependent frames are sometimes further categorized in P frames and B frames. P frames can use data from previous frames to decode and are thus more compressible than I frames. B frames can use both previous and forward frames to decode and may therefore achieve the highest amount of data compression.

Figure 1:
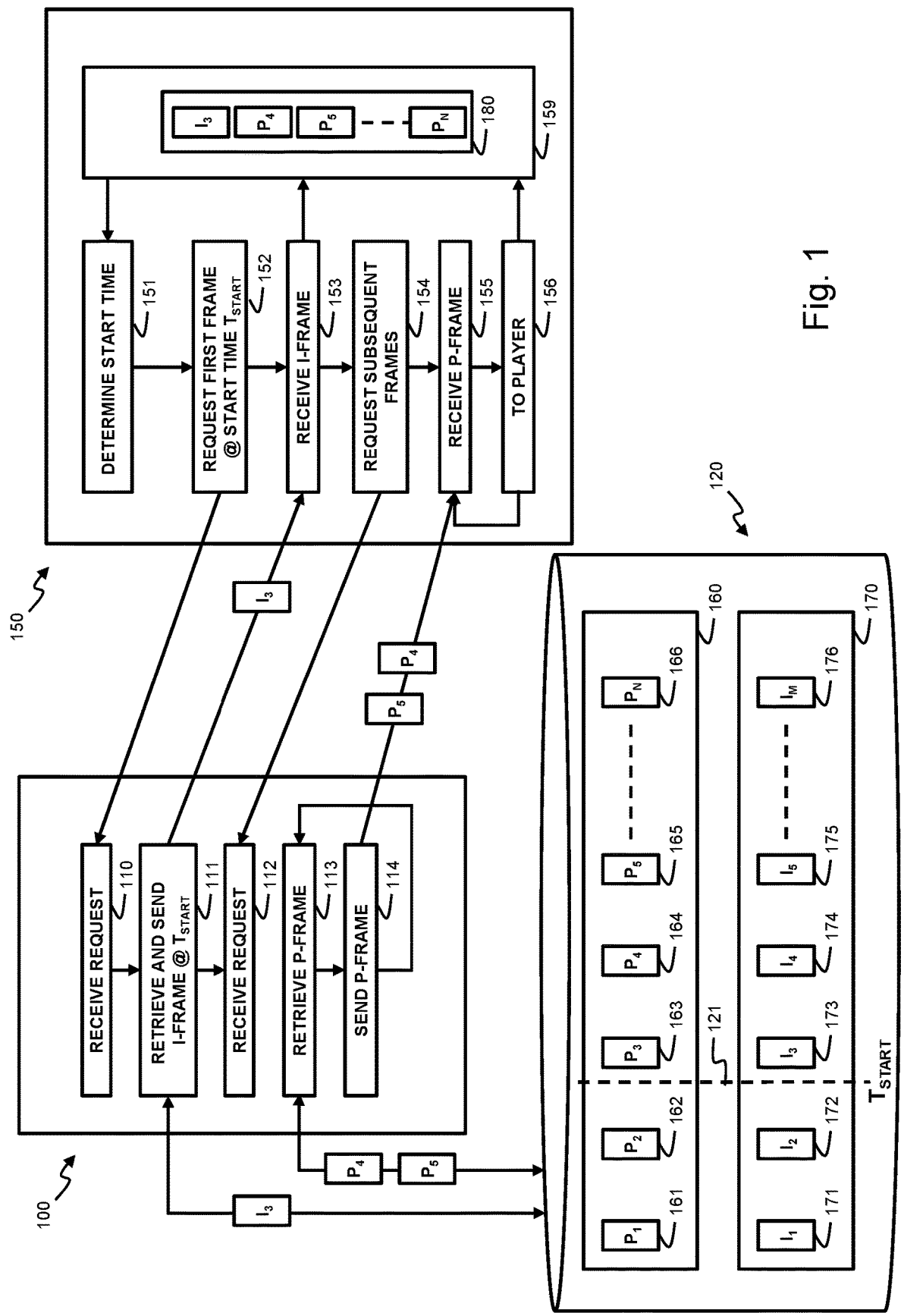
FIG. 1 illustrates a server, a data storage with video and a client according to an embodiment of the invention.

FIG. 1 illustrates a streaming server 100 for providing video streams to a client 150 according to an embodiment of the invention. FIG. 1 illustrates steps 151 to 156 performed by the client 150 to play a video 180 within a video player 159, e.g. a video player application or a web browser. The steps performed by the client 150 interact with steps 110 to 114 performed by the server 100. At a certain moment in time, the client 150 determines in step 151 to stream a video from server 100 starting at a selected moment in time within the video, i.e. the starting time 121. Starting time 121 may be the beginning of the video as the result of a user that starts to watch the video. Starting time 121 may also be any arbitrary time within the course of the video as the result of a forward seeking action by the viewer during the playback of the video. Starting time 121 may also corresponds to a current time when the video stream is a live stream. The client 150 then proceeds to step 152 in which it sends a request to the server 100 for a key frame that corresponds with the starting time 121.

Thereupon, the server 100 receives the request at step 110. The server then determines the key frame which corresponds to the requested starting time 121 from a temporal independent version 170 of the video. In the embodiment of FIG. 1, this temporal independent version is available in a data store 120 accessible by the server 100. The temporal independent version of the video is a version of the video that only comprises key frames 171 to 176 and no dependent frames. Apart from this version, the data store 120 also comprises a temporal dependent version 160 of the video comprising frames 161 to 166. As the client may request an independent frame corresponding to any starting point within the video, it may be said that the independent version 160 of the video is available to the client 150 upon its request. In order to determine the corresponding key frame, the server 100 may for example do one of the following: i) select the key frame 173 with a time stamp which is the closest to the starting time 121; ii) select the key frame 173 which is subsequent to the starting time 121; or iii) select the key frame 172 which comes prior to the starting time 121. After retrieval of the key frame 173, the server 100 sends the key frame 173 in response to the client 150. The client then receives key frame 173 in step 153 and provides it to the video player 159 for decoding.

Then, the client 150 proceeds to step 154 in which it requests the subsequent frames of the dependent version 160 of the video. Alternatively, step 154 may also be done in parallel with the first request 152 to further ensure the timely delivery of the dependent frames. At the server 100, the request is received at step 112 upon which the server proceeds to step 113 to retrieve the requested dependent frames. To this respect, the server retrieves the first dependent frame 164 subsequent to the key frame 173 and, thereafter, sends the dependent frame 164 to the client in response. Steps 113 and 114 are then continuously repeated until the last dependent frame 166 of the request is received by the client 150. If there is no end frame or time specified in the request of the client 150, then the server sends the subsequent depending frames up to the end of the video or up to a certain predefined maximum playing time before the end of the video.

At the client 150 side, similar steps 155 and 156 are continuously repeated, i.e. in step 155, the client 150 receives the next dependent frame from the server 100 and forwards the frame to the player 159. As a result, the video player 159 receives a video stream 180 comprising a first key frame 173 followed by the dependent frames 164 to 166.

Advantageously, the requests and responses between the client 150 and the server are performed according to the Hypertext Transfer Protocol (HTTP), i.e. by an HTTP GET request from the client and HTTP response from the server. More advantageously, the second request 154 for the subsequent frames establishes a chunked transfer encoding session with the sever allowing the dependent frames to be streamed over a single persistent connection. Support for chunked transfer encoding was introduced in HTTP/1.1. Even more advantageously the request 154 for the subsequent frames is a byte range request wherein the requested byte range corresponds with the range of dependent frames starting after the requested key frame 173. Support for byte range requests was also introduced in HTTP/1.1 and is specified in detail in the IETF's RFC 7233 of June 2014. Information on the availability of the video in both the independent and dependent version may be provided in the form of a URL to a manifest file that is available on the server, for example a manifest file following the Common Media Application Format (CMAF) for segmented media according to ISO/IEC 23000-19.

Figure 2:
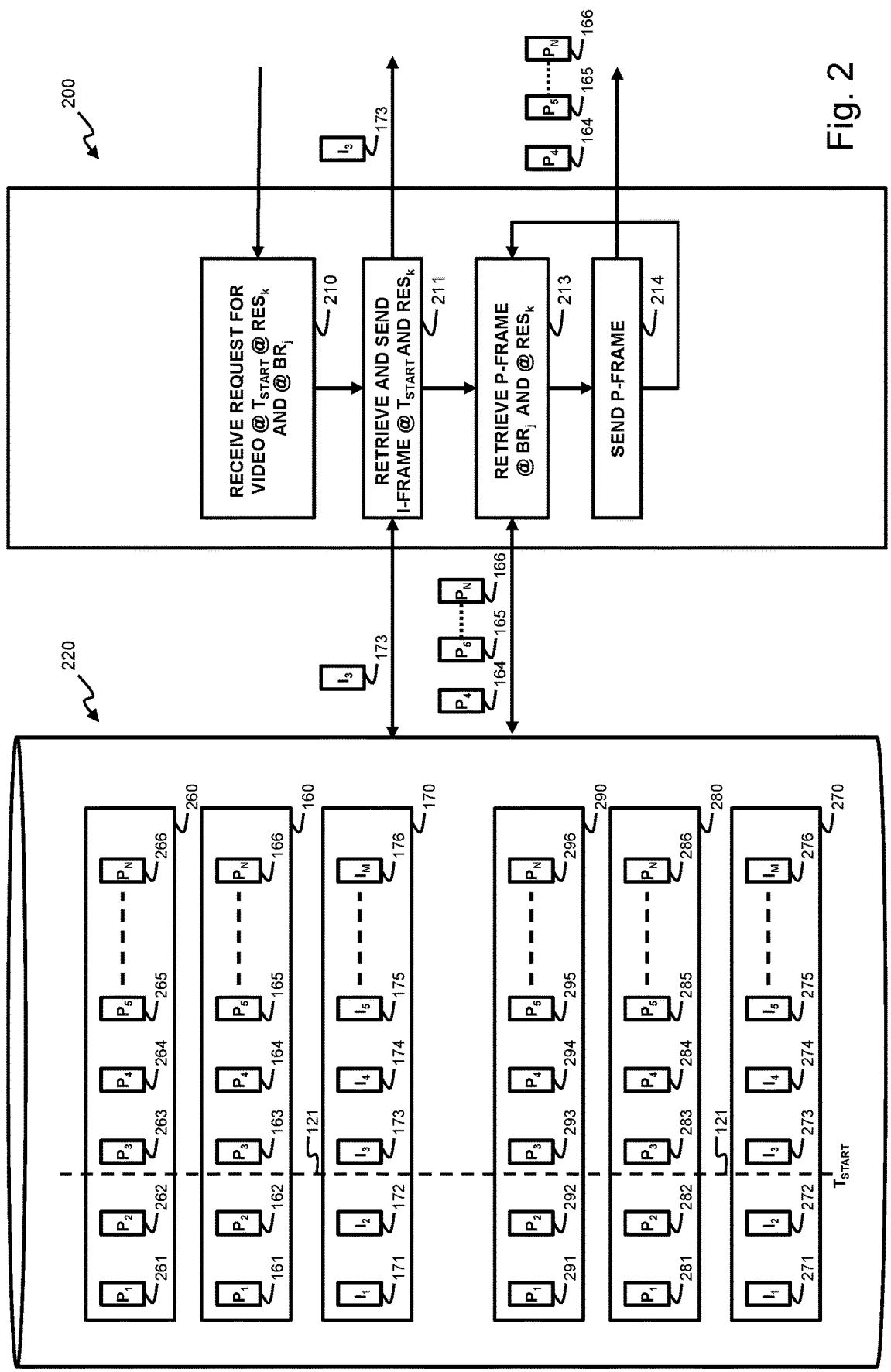
FIG. 2 illustrates a server and storage according to another embodiment of the invention.

FIG. 2 illustrates a streaming server 200 according to an embodiment of the invention. Similar to server 100, server 200 also provides the temporal independent version 170 and a temporal dependent version 160 of a video to clients upon request. Additionally, server 200 also provides different bit rates and/or resolutions of a single video allowing for bit rate adaptation by clients. Storage 220 comprises a first temporal independent version 170 of the video with a first resolution having independent frames 171 to 176. Storage 220 also comprises two temporal dependent versions 160 and 260 each having the same resolution but a different bit rate. Versions 160 and 260 respectively have frames 161 to 166 and 261 to 266. As an example, version 160 may be a high-quality version of the video with a higher bit rate then the second version 260 which then offers a lower video quality at a lower bit rate. Similarly, storage 220 may also comprise a second temporal independent version 270 of the video with a second resolution having independent frames 271 to 276. The second resolution may for example be a smaller resolution targeted to mobile devices with smaller screen resolutions. Storage 220 also comprises two temporal dependent versions 280 and 290 each having the second resolution but again with different bit rates. Versions 280 and 290 respectively have frames 281 to 286 and 291 to 296.

Steps 210 to 214 illustrates steps performed by server 200 when streaming the video to client device, e.g. client 150 of FIG. 1. In the first step 210, server 200 receives a request from the client to stream the video from the selected starting time 121 in a selected resolution, e.g. the first resolution, and with a certain bit rate, e.g. the higher bit rate. Then, server 200 proceeds to step 211 where the temporal independent frame 173 is retrieved from the data storage 220, for example in a similar way as illustrated with respect to FIG. 1, and sends this frame 173 to the client. Thereupon, or in parallel, the server 200 proceeds to step 213 where it retrieves the next dependent frame 164 of the video and sends it to the client in step 214. Steps 213 and 214 are then continuously repeated until the requested end frame is sent to the client.

In the example of FIG. 2, a single request is issued by the client to retrieve both the independent and dependent frames. Alternatively, the request may also be done by a first request for the independent frame 173 and a second request for the subsequent dependent frames 164-166 as was illustrated in the embodiment of FIG. 1.

Furthermore, a client may also change between the dependent versions of the video by changing the requested resolution and/or bit rate. This change may be accomplished by issuing a new request for the video at a selected starting point for a certain bite rate and resolution. The same steps 210 to 214 may then be performed by the server.

Figure 3:
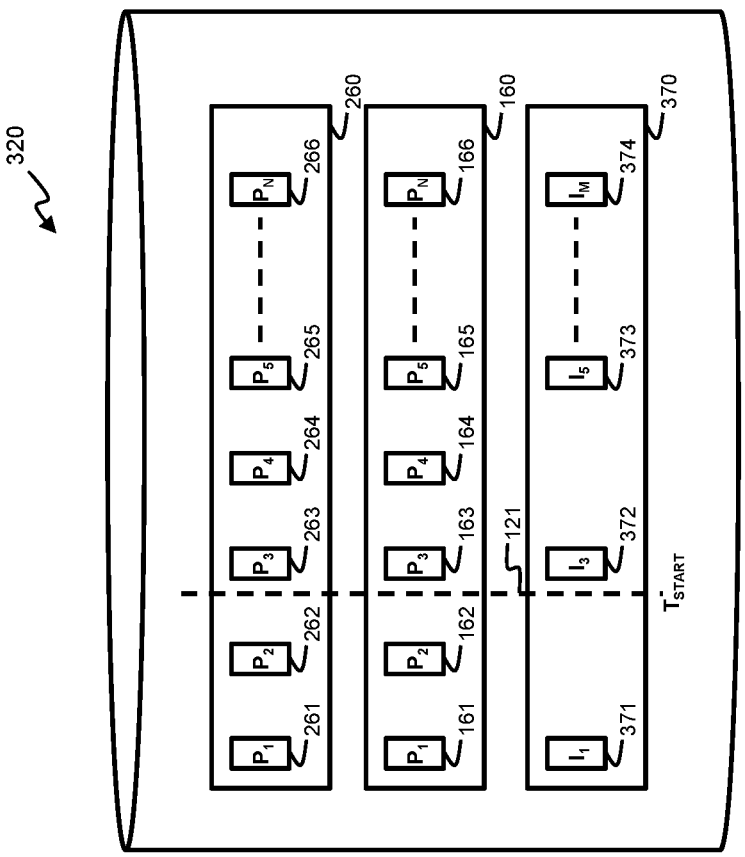
FIG. 3 illustrates a storage according to another embodiment of the invention.

FIG. 3 illustrates a data storage 320 according to an embodiment of the invention. Data storage 320 may be used to interact with a streaming server according to embodiments of the invention, e.g. with streaming server 100 and 200. Data storage 320 stores three versions 370, 160 and 260 of a video. The first version 370 is a temporal independent version comprising key frames 371 to 374. The second and third versions 160 and 260 are temporal dependent versions having respective frames 161 to 166 and 261 to 260. The frame rate of the first version 370 is lower than the frame rate of the dependent versions 160 and 260. In the example of FIG. 3, the frame rate of the first version 370 is half the frame rate of the dependent versions 160 and 260. This means that not every dependent frame is aligned with an independent frame. When the streaming server then request for an independent frame corresponding with the starting time 121, the same selection process as for step 111 of FIG. 1 may be followed. The difference is that the selected independent frame may have a larger offset in time from the starting time 121 than in the case of FIG. 1 and FIG. 2. The delay between the request of the client and the playback of the first frame will be the same. For example, key frame 371 may be selected by the streaming server as corresponding to starting time 121 upon which independent frame 371 is sent to the client followed by dependent frames 162 to 166 or dependent frames 262 to 266 depending on the requested bit rate. Alternatively, key frame 372 may be selected by the streaming server as corresponding to starting time 121 upon which key frame 372 is sent to the client followed by dependent frames 164 to 166 or dependent frames 264 to 266 again depending on the requested bit rate.

Figure 4:
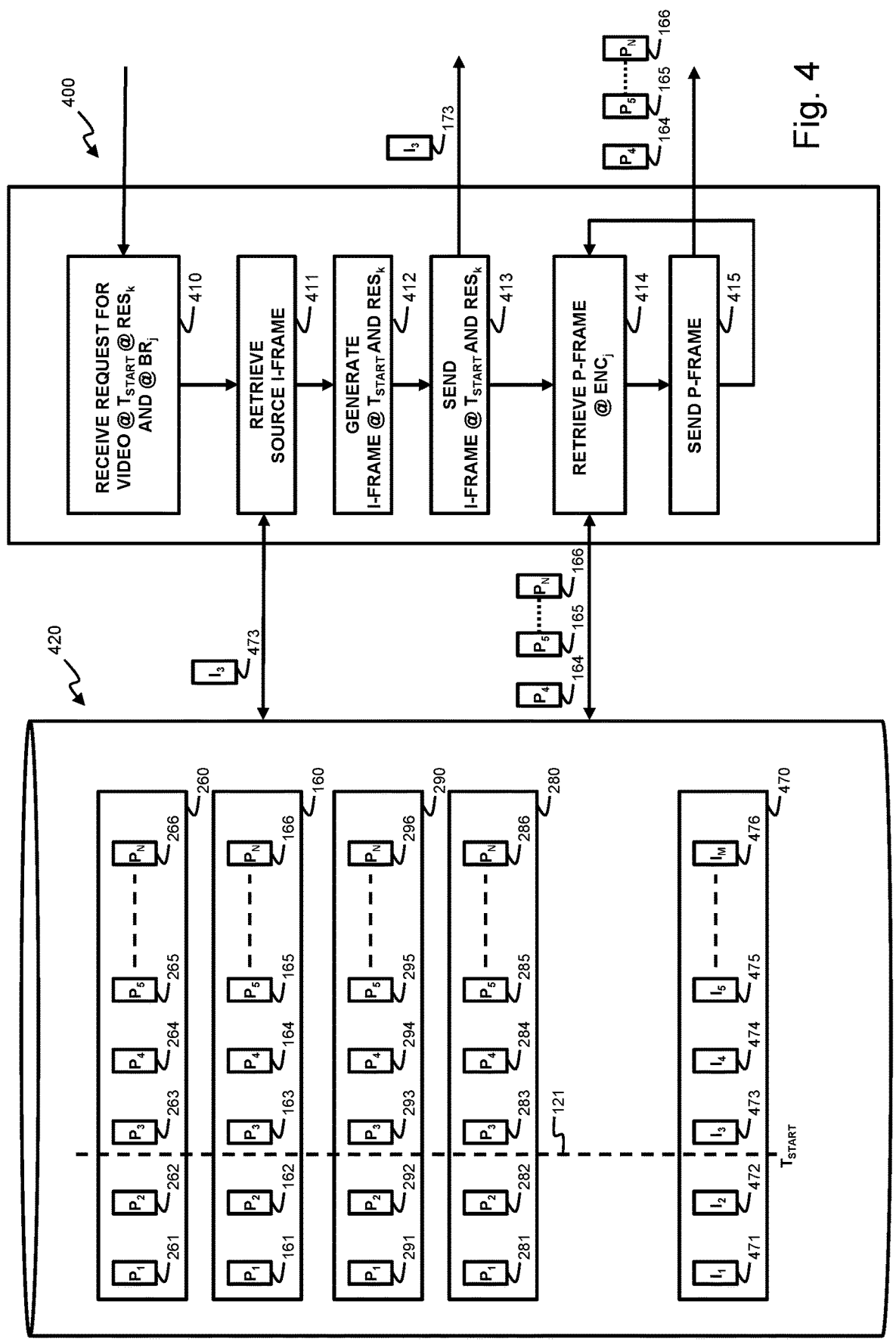
FIG. 4 illustrates a server and storage according to another embodiment of the invention.

FIG. 4 illustrates a streaming server 400 according to an embodiment of the invention. Similar to servers 100 and 200, server 400 also provides a temporal independent version (not shown in FIG. 4) and temporal dependent versions 160, 260, 280 and 290 of a video to clients upon request. Similar to storage 220, server 400 retrieves the dependent versions from data storage 420. Storage 420 also comprises the two temporal dependent versions 160 and 260 each having the same first resolution but a different bit rate. Versions 160 and 260 respectively have frames 161 to 166 and 261 to 266. Storage 420 also comprises the two temporal dependent versions 280 and 290 each having a second resolution but again with different bit rates. Versions 280 and 290 respectively have frames 281 to 286 and 291 to 296. Different from data store 220, data store 420 only comprises one independent version 470 of the video. Preferably, this version 470 has at least the highest resolution of the dependent versions. Version 470 may further comprise the source frames of the video wherein the source frames have a different encoding than the dependent versions, for example a lossless compression or even no compression at all. Therefore, version 470 may have independent frames which are not supported by the decoder of the client.

Steps 410 to 415 illustrates steps performed by server 400 when streaming the video to a client device, e.g. client 150 of FIG. 1. In the first step 410, server 400 receives a request from the client to stream the video from the selected starting time 121 in a selected resolution, e.g. the first resolution, and in a certain bit rate, e.g. the higher bit rate. Then, server 400 proceeds to step 411 and retrieves the source frame 473 that corresponds with the starting time 121 from the source version 470 of the video in the data store 420. This source frame 473 may be in a different resolution and/or coding that those of the dependent versions. Therefore, in step 412, the server 400 generates from the source frame 473 the key frame 173 in the requested resolution and according to the encoding of the dependent version. In the next step 413, this key frame 173 is sent to the client. The remaining steps 414 and 415 may then be identical to respective steps 213 and 214 of FIG. 2. In step 414, the server retrieves the subsequent dependent frame 164 of the video in the requested resolution and bit rate and sends it to the client in step 415. Steps 414 and 415 are then continuously repeated until the requested end frame 166 is sent to the client.

Figure 5:
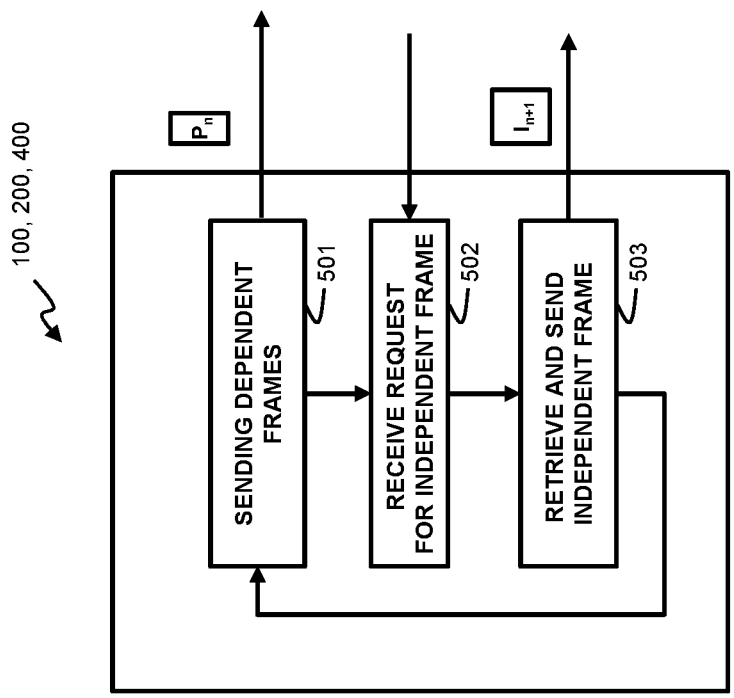
FIG. 5 illustrates a server and steps performed by the server for serving video stream requests according to an embodiment of the invention.

FIG. 5 illustrates steps performed by a streaming server according to an embodiment of the invention. The steps may for example be performed by the servers 100, 200 and 400. At step 501, the server is streaming dependent frames to a client. Step 501 may thus correspond to the combination of steps 113-114 of FIG. 1, steps 213-214 of FIG. 2 or steps 414-415 of FIG. 4. During the sending of the dependent frames, the server may receive in step 502 an additional request from the client for an additional independent frame. The client may do so to restore artefacts that appear in the displayed video. Upon receiving the request, the server proceeds to step 503, retrieves the requested independent frame and sends the frame to the client. The server then returns to step 501 and continues sending the dependent frames.

Figure 6:
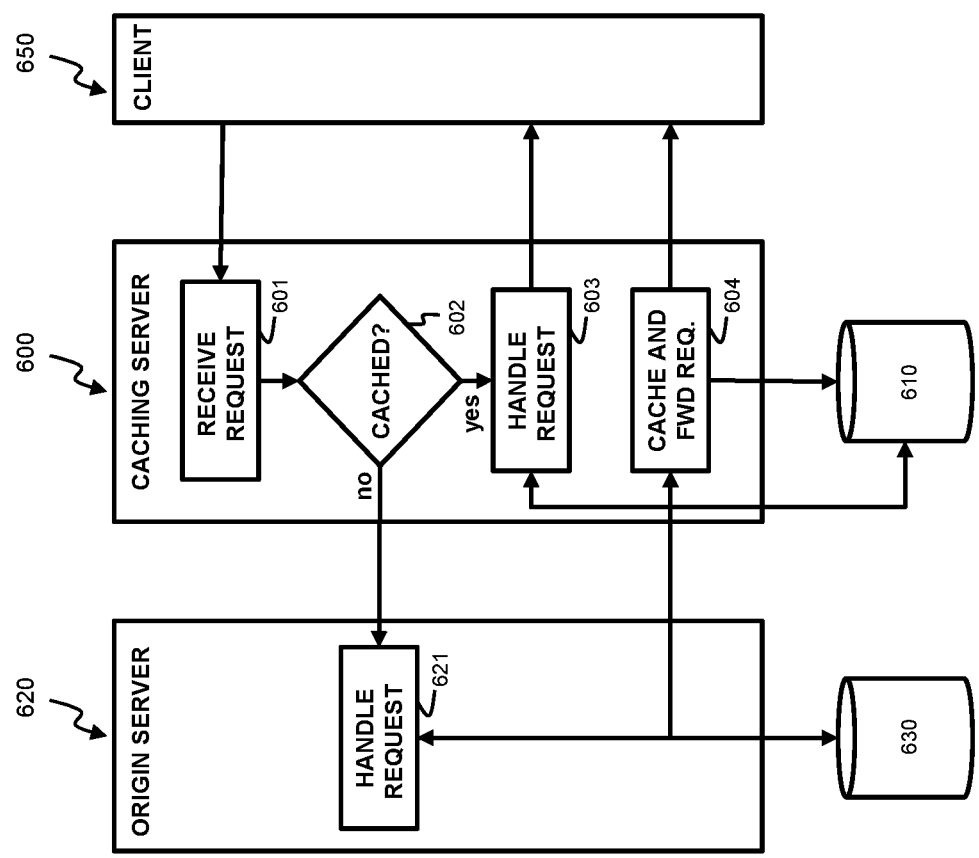
FIG. 6 illustrates an origin server, a caching server and a client according to an embodiment of the invention.

FIG. 6 illustrates the application of the streaming server according to the various embodiments above within a streaming network. The streaming server may be used as a caching server 600 or as an origin server 620. When used as a caching server 620, the server receives the requests for the independent or dependent frames from the client 650 in the step 601, similar to steps 110, 112, 210, 410 and 602. The server then first verifies in step 602 whether a response to this request has already been cached in data store 610. If so, the server handles the request in step 603 and provides the requested frames to the client 650. The handling of the request with the data store 610 is done as outlined above with respect to the embodiments of FIG. 1 to 5. If server 600 cannot handle the request, then it forwards the request to an upstream server, e.g. the origin server 620. Upon receiving this request, the origin handles the request in a step 621 by retrieving the frames from data store 630 in a similar way as in step 603. As server 620 is an origin server, all frames are available to the server 620 and the request will thus always be handled. The response with the requested frame(s) is then send back to the client. As the caching server is located between the client 650 and the origin server 630 in the communication network, the caching server will intercept the response in step 604 and cache the frames in data store 610 and, at the same time, forward the response to the client 650.

Embodiments of the invention have been described by solely referring to video frames that are exchanged between server and client. It should be understood that the video frames may also be accompanied by other media that is to be represented in the client player during the playback of the frame. Other media may for example comprise one or more audio tracks or subtitles. Other media may also comprise additional frames of other video streams, for example in the case of panoramic video or video with multiple viewing angles.

Each frame may also be encapsulated by the server in a frame packet with an additional header. The header may then comprise further information about the content of the packet. Header information may comprise the following fields:
- Decode Time Stamp: a number which parameterizes the frame in time. It describes the timestamp of this frame on the decoding timeline, which does not necessarily equal the presentation timeline used to present the media. The timestamp may further be expressed in timescale units (see below).
- Presentation Time Stamp: a number which describes the position of the frame on the presentation timeline. The timestamp may further be expressed in timescale units (see below).
- Timescale: the number of time units that pass in one second. This applies to the timestamps and the durations given within the frame. For example, a timescale of 50 would mean that each time unit measures 20 milliseconds. A frame duration of 7 would signify 140 milliseconds.
- Frame Duration: an integer describing the duration of the frame in timescale units.
- Type: a field describing the type of frame, e.g. a video independent frame, a video non-independent frame, an audio independent frame, an audio dependent frame.
- Media Data Size: the actual length of the frame itself.

Figure 7:
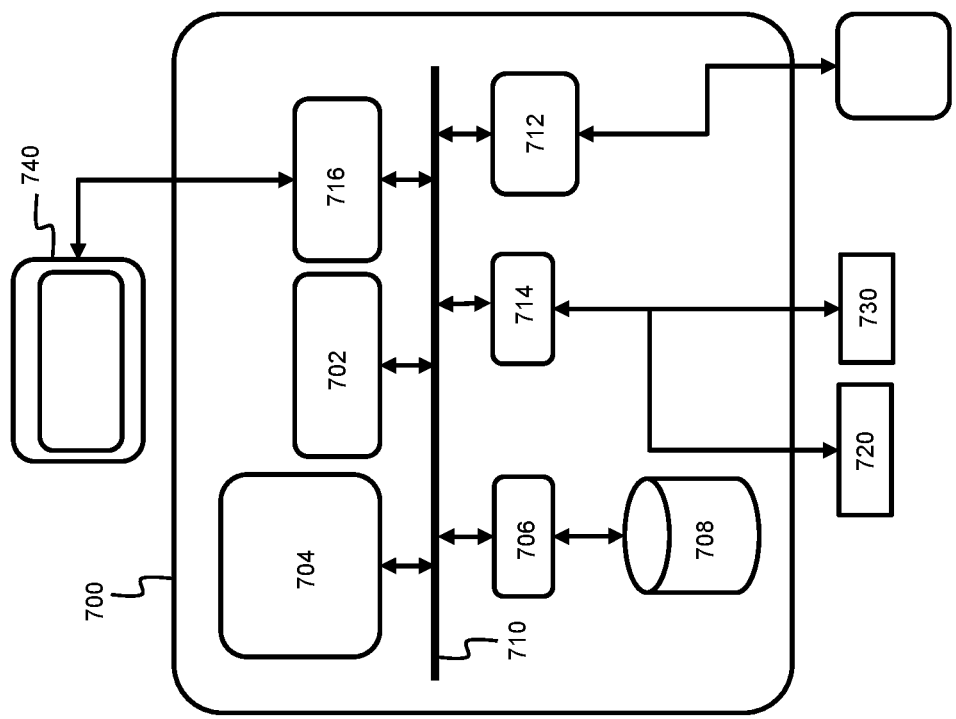
FIG. 7 illustrates a suitable computing system for performing methods according to various embodiments of the invention.

Independent frames may further comprise the following fields in the header:
- Width: the width of the independent frame and all subsequent dependent frames.
- Height: the height of the independent frame and all subsequent dependent frames.
- Total Duration: the total duration of the track this independent frame belongs to, e.g. expressed in timescale units.
- Decoder configuration and codec information FIG. 7 shows a suitable computing system 700 according to an embodiment of the invention. Computing system 700 is suitable for performing the steps performed by the server or the client of FIG. 1 to 6 according to the above embodiments. Computing system 700 may therefore serve as a partial or complete implementation of server 100, 200, 400, 600 and 620. Computing system 700 may also serve as a partial or complete implementation of client 150 and 650. Computing system 700 may in general be formed as a suitable general-purpose computer and comprise a bus 710, a processor 702, a local memory 704, one or more optional input interfaces 714, one or more optional output interfaces 716, a communication interface 712, a storage element interface 706 and one or more storage elements 708. Bus 710 may comprise one or more conductors that permit communication among the components of the computing system 700. Processor 702 may include any type of conventional processor or microprocessor that interprets and executes programming instructions. Local memory 704 may include a random-access memory (RAM) or another type of dynamic storage device that stores information and instructions for execution by processor 702 and/or a read only memory (ROM) or another type of static storage device that stores static information and instructions for use by processor 702. Input interface 714 may comprise one or more conventional mechanisms that permit an operator to input information to the computing device 700, such as a keyboard 720, a mouse 730, a pen, voice recognition and/or biometric mechanisms, etc. Output interface 716 may comprise one or more conventional mechanisms that output information to the operator, such as a display 740, etc. Communication interface 712 may comprise any transceiver-like mechanism such as for example one or more Ethernet interfaces that enables computing system 700 to communicate with other devices and/or systems. The communication interface 712 of computing system 700 may be connected to such another computing system by means of a local area network (LAN) or a wide area network (WAN) such as for example the internet. Storage element interface 706 may comprise a storage interface such as for example a Serial Advanced Technology Attachment (SATA) interface or a Small Computer System Interface (SCSI) for connecting bus 710 to one or more storage elements 708, such as one or more local disks, for example SATA disk drives, and control the reading and writing of data to and/or from these storage elements 708. Although the storage elements 708 above is described as a local disk, in general any other suitable computer-readable media such as a removable magnetic disk, optical storage media such as a CD or DVD, -ROM disk, solid state drives, flash memory cards, . . . could be used. The system 700 described above can also run as a virtual machine above the physical hardware.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the scope of the claims are therefore intended to be embraced therein.

It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A server for streaming a video to a client over a communication network,
    wherein the server is configured to make the video available to the client upon request in at least one temporal independent version and at least one temporal dependent version, the temporal independent version including only key frames decodable independently of other frames, and the temporal dependent version including dependent frames that are decodable based on information of other frames; and
    wherein the server includes:
        one or more processors; and
        memory storing one or more programs configured to be executed by the one or more processors, the one or more programs including instructions for:
            receiving a request from the client to receive a stream of the video from an arbitrary starting point in time onwards; and
            retrieving at least a first frame of the stream from the temporal independent version of the video; and
            wherein the first frame corresponds with the starting point in time; and
            retrieving frames subsequent to the at least first frame from the temporal dependent version; and
            sending the at least first frame to the client and sending the frames subsequent to the at least first frame to the client such that the video is streamed to the client and starts with at least one temporal independent frame associated with the starting point in time.

2. The server according to claim 1 wherein the retrieving the first frame further comprises selecting the first frame as:
    the frame of the temporal independent version closest to the arbitrary starting point in time;
    the frame of the temporal independent version subsequent to the arbitrary starting point in time; or
    the frame of the temporal independent version prior to the arbitrary starting point in time.

3. The server according to claim 1 wherein the temporal independent version has a lower frame rate than the temporal dependent version.

4. The server according to claim 1 wherein the receiving a request further comprises:
    receiving a first request for the at least the first frame of the stream; and
    receiving a second request for the frames subsequent to the at least first frame.

5. The server according to claim 4 wherein the second request is a byte range request comprising a byte range indicative for a portion of the video starting with the frames subsequent to the at least first frame.

6. The server according to claim 1 wherein the sending the frames comprises sending the frames as chunks of a chunked transfer encoding session with the client.

7. The server according to claim 1 further configured to perform the following steps:
    during the sending the frames subsequent to the at least first frame, receiving from the client a further request for a temporal independent version of one of the frames subsequent to the at least first frame;
    thereupon, retrieving the requested temporal independent version of one of the frames from the temporal independent version of the video; and
    sending the retrieved temporal independent version of one of the frames to the client.

8. The server according to claim 1 further configured to generate a frame of the temporal independent version of the video from a source video upon receiving a request for the frame from the client.

9. The server according to claim 1 wherein the server is a caching server for cached serving of requests from the client to an origin server.

10. The server according to claim 1 wherein the server is an origin server.

11. The server according to claim 1 further configured to:
    during the sending the frames subsequent to the at least first frame, receiving from the client a further request for a temporal dependent or independent version of one or more frames with a different quality; and
    providing the one or more frames with the different quality.

12. A client for streaming a video from a server over a communication network,
    wherein the video is available from the server to the client upon request in at least one temporal independent version and at least one temporal dependent version, the temporal independent version including only key frames decodable independently of other frames, and the temporal dependent version including dependent frames that are decodable based on information of other frames; and
    wherein the client includes:
        one or more processors; and
        memory storing one or more programs configured to be executed by the one or more processors, the one or more programs including instructions for:
            sending a request to the server to receive a stream of the video from an arbitrary starting point in time onwards; and
            receiving from the server at least a first frame of the stream from the temporal independent version of the video; and
            wherein the first frame corresponds with the starting point in time; and receiving from the server, frames subsequent to the at least first frame from the temporal dependent version; and playing the video from the starting point in time onwards by the at least first frame followed by the frames.

13. A computer-implemented method for streaming a video to a client over a communication network, wherein the video is available to the client upon request in at least one temporal independent version and at least one temporal dependent version, the temporal independent version including only key frames decodable independently of other frames, and the temporal dependent version including dependent frames that are decodable based on information of other frames, and wherein the method comprises the following steps:
receiving a request from the client to receive a stream of the video from an arbitrary starting point in time onwards;

retrieving at least a first frame of the stream from the temporal independent version of the video, wherein the first frame corresponds with the starting point in time;

retrieving frames subsequent to the at least first frame from the temporal dependent version; and sending the at least first frame to the client and sending the frames subsequent to the at least first frame to the client such that the video is streamed to the client and starts with at least one temporal independent frame associated with the starting point in time.

14. A non-transitory computer-readable storage medium comprising a computer program including instructions for streaming a video to a client over a communication network, wherein the video is available to the client upon request in at least one temporal independent version and at least one temporal dependent version, the temporal independent version including only key frames decodable independently of other frames, and the temporal dependent version including dependent frames that are decodable based on information of other frames, and wherein operations for streaming the video comprises:
receiving a request from the client to receive a stream of the video from an arbitrary starting point in time onwards;

retrieving at least a first frame of the stream from the temporal independent version of the video, wherein the first frame corresponds with the starting point in time;

retrieving frames subsequent to the at least first frame from the temporal dependent version; and sending the at least first frame to the client and sending the frames subsequent to the at least first frame to the client such that the video is streamed to the client and starts with at least one temporal independent frame associated with the starting point in time.

15. The server of claim 1, wherein the at least one temporal independent version of the video includes two temporal independent versions each with a different bit rate.

16. The server of claim 15, wherein the two temporal independent versions have different resolutions.

17. The server of claim 1, wherein the at least one temporal dependent version of the video includes two temporal dependent versions each with a different bit rate.

18. The server of claim 17, wherein the two temporal dependent versions have the same resolution.

19. The server of claim 17, wherein the each of the two temporal dependent versions corresponds to a respective temporal independent version having a corresponding resolution.

* * * * *